Aug. 16, 1949.    G. A. LYON    2,478,930
WHEEL COVER
Filed Dec. 6, 1943    2 Sheets-Sheet 1
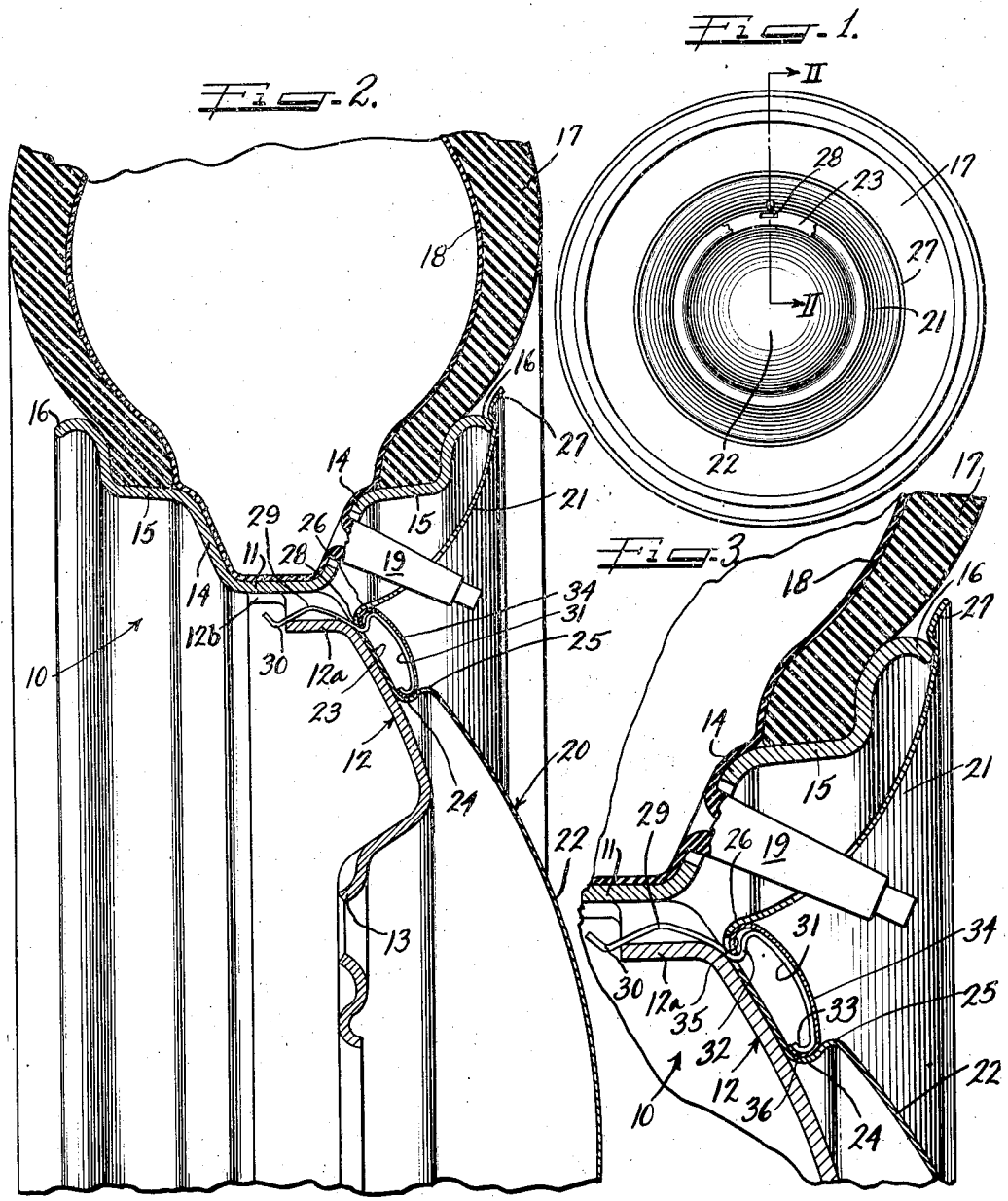
Inventor
GEORGE ALBERT LYON
by Charles H. Hill Attys.

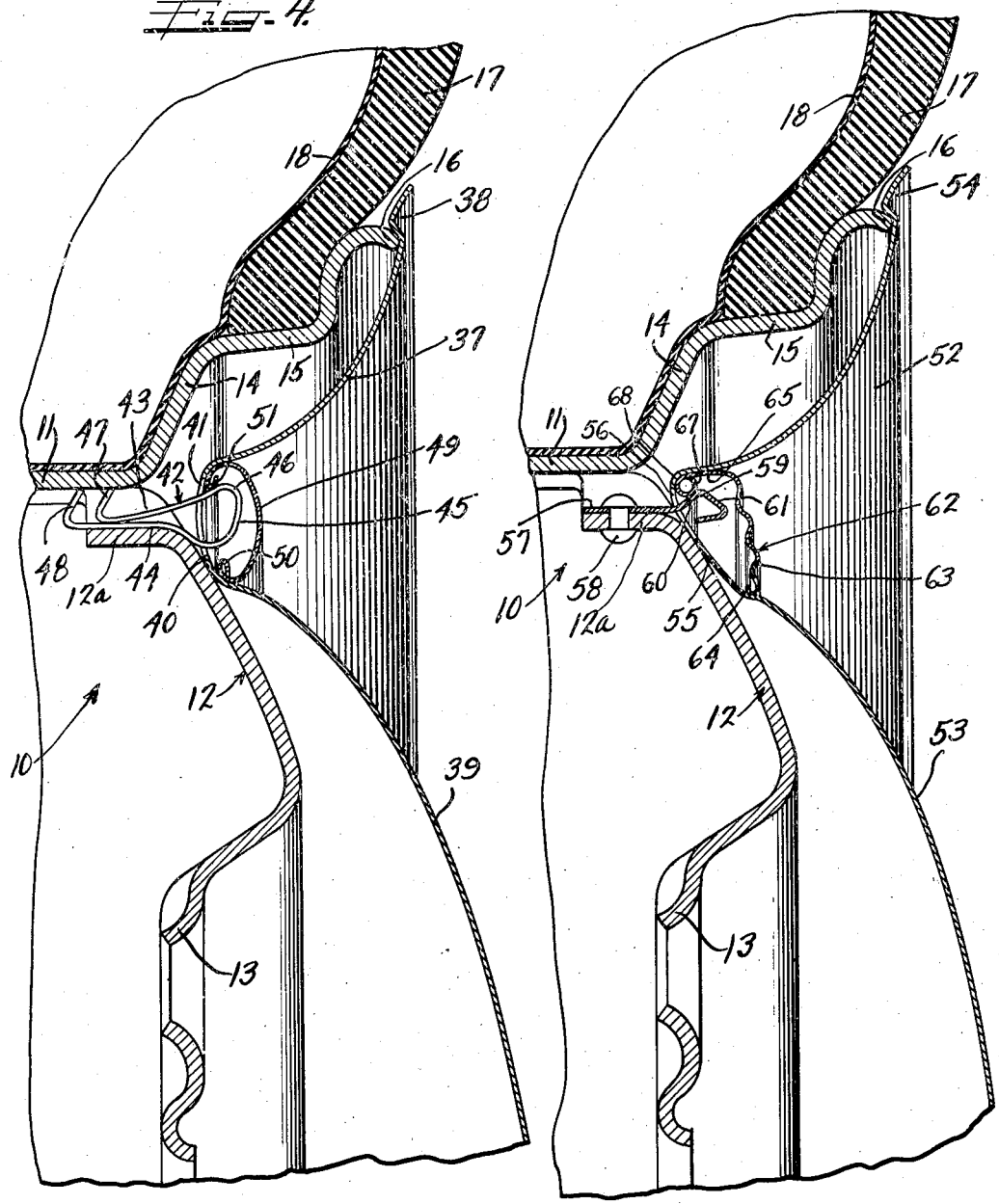

Patented Aug. 16, 1949

2,478,930

UNITED STATES PATENT OFFICE 2,478,930

WHEEL COVER

George Albert Lyon, Allenhurst, N. J.

Application December 6, 1943, Serial No. 513,032

10 Claims. (Cl. 301—37)

This invention is directed to an improved wheel construction and relates more particularly to an improved cover assembly therefor.

It is a principal object of the invention to provide for disposition over the outer side of a wheel structure a generally circular cover member arranged to conceal the same, said cover being formed from synthetic plastic sheet material or the like, whereby it is locally, temporarily, resiliently flexible and yet is self-sustaining as to form and will immediately snap back into initial configuration when distorting pressures are relieved therefrom, the cover including an outer annular part having a cross-sectional configuration substantially simulating the side wall of a tire in the tire rim, thus to give the appearance of being a part thereof and extending over the flanges of a tire rim of the wheel structure to conceal the same.

In the use of wheel covers having the above characteristics it is found that ordinarily the inherent strength of the material of the cover is such that intermediate reinforcement and support therefor is highly desirably particularly in order to strengthen the association of wheel engaging means therewith.

Accordingly it is another object of the invention to provide, for a sheet synthetic plastic cover member, improved retaining means for maintaining the same on the outer side of a wheel structure.

It is another object of the invention to provide for a synthetic sheet plastic cover member improved retaining means together with improved reinforcing and ornamenting means for maintaining the same over the outer side of the wheel structure.

It is still another object of the invention to provide for a cover assembly adapted to be disposed over the outer side of a wheel structure, improved retaining means including an axially inner part arranged for attached engagement with a part of the wheel structure, said retaining means including an axially outer portion arranged to extend through an opening in the cover member, said axially outer portions of the retaining means being arranged to retainingly receive an annular, intermediate, reinforcing bead which strengthens the intermediate part of the cover and also conceals the openings therein through which the retaining means extends.

It is still a further object of the invention to provide for a wheel structure having a flanged tire rim and a central load bearing portion, there being wheel openings circumferentially spaced along the connection between the central load bearing portion, a circular disk-like cover member formed from sheet synthetic plastic material or the like, said cover member having therein circumferentially spaced openings aligned with the wheel openings and through which extend retaining clip members having resilient fingers arranged to retainingly engage in the wheel openings and having at the axially outer part thereof enlarged portions arranged to overlie the adjacent portion of the outer side of the cover to retainingly secure the cover on the wheel structure, there being provided an annular member arranged to envelop the axially outer parts of said clip members to reinforce the intermediate part of the cover and to conceal the clips, together with the openings in the cover through which they extend.

In accordance with the general features of the present invention there is provided herein a wheel structure including a flanged tire rim and a central load bearing portion, there being circumferentially spaced openings in the wheel structure along the connection of the rim and the central load bearing portion, and a cover assembly including a disk-like cover member having openings formed therein and aligned with the openings in the wheel structure, there being spring clips having axially inner portions arranged for engagement with the wheel structure at said wheel openings and extending through the openings in the cover member to merge with an enlarged, axially outer portion arranged to maintain the same over the wheel structure, said axially outer portions of the clip members comprising generally radially extending loops which are concentrically spaced with respect to the remainder of the wheel and cover structure and are adapted to retainingly receive an annular bead which serves as a cover hold-on medium, as a reinforcing medium for the intermediate part of the cover and also serves to ornament the same and conceal the axially outer portions of the clips and the openings in the cover through which they extend.

In accordance with other general features of the invention there is provided herein a disk-like cover member formed from sheet material, said cover member including an outer annular portion and a central crowned hub cap simulating portion, there being provided an intermediate, annular junction part comprising a generally axially inwardly extending groove having circumferentially spaced openings therein, said openings being adapted to receive therethrough retaining clips, each including an axially inner wheel engaging part and an axially outer loop portion over which may be disposed an annular bead member for reinforcing the portion of the cover in the vicinity of the openings therein, for concealing said openings, and for aiding in the retention of the cover on the wheel.

Other objects and advantages of the invention will become apparent from the following description and accompanying drawings in which:

Figure 1 is a side elevational view with parts broken away, of a wheel structure showing one form of my invention;

Figure 2 is a fragmentary enlarged cross-sectional view taken on the line II—II of Figure 1;

Figure 3 is a fragmentary enlarged view of the structure shown in Figure 2;

Figure 4 is a fragmentary enlarged cross-sectional view of a wheel structure embodying another form of my invention; and Figure 5 is a fragmentary enlarged cross-sectional view of a wheel structure embodying a still further modified form of my invention.

It will be understood that the embodiments disclosed herein are for illustrative purposes only and may be changed or modified without departing from the spirit and scope of the invention as set forth in the appended claims.

In each of the above described figures the wheel structures shown are identical and thus similar parts will be similarly identified.

As shown herein the wheel structure includes a flanged tire rim of the drop center type having a base flange 11 and a central load bearing portion or spider 12 having a generally axially inwardly extending peripheral flange 12a which may be secured to the base flange 11 of the tire rim by means of welding or riveting or the like.

As will be seen from the drawings, the flange 12a of the central load bearing portion 12 is provided with circumferentially spaced depressed parts affording wheel openings spaced circumferentially along the junction of the tire rim and the central load bearing portion, the portions of the flange 12a which are depressed being preferably cut back as shown at 12b in Figure 1. The central load bearing portion 12 is further provided with a central bolt-on flange 13 which may be secured to an appropriate part of the vehicle with which the wheel is associated, such as the brake drum or the like.

The tire rim 10 is further provided with opposite side wall flanges 14, opposite intermediate flanges 15 and opposite edge portions 16 between which may be disposed a tire including a casing 17 and an inner tube 18 having a valve stem 19 associated therewith. The valve stem 19 is aligned with and extends through a suitable aperture in the adjacent side wall flange 14.

The cover assembly of Figures 1, 2 and 3 includes a circular disk-like member 20 formed from sheet synthetic plastic or the like, whereby it is locally, temporarily, resiliently flexible and yet self-sustaining as to form and whereby it immediately snaps back into its initial configuration when distorting pressures are relieved therefrom. The cover member 20 includes a radially outer curvate portion 21 and a central crowned portion 22, these portions being integrally joined by an annular grooved portion 23 which is defined on its radially outer side by a generally radially outwardly opening grooved part 24 and a generally radially outwardly extending bead 25 and, on its radially inner side by a generally radially inwardly opening grooved portion 26.

Preferably the radially outer edge of the curvate portion 21 is formed into a generally axially outwardly, radially outwardly extending flange 27 which terminates radially outwardly of the edge portion 16 of the tire rim and in the vicinity of the side wall of the tire 17. Preferably the curvate portion 21 of the cover is of such cross-sectional expanse that it extends from the edge portion of the tire rim radially inwardly to a point beyond the junction of the rim and the central load bearing portion 12 and is formed cross-sectionally so as to generally simulate the cross-sectional configuration of the side wall of the tire to give the appearance of being a continuation thereof and to appear as the white side wall of the tire, when colored white. Preferably, also, the cover portion 21 is provided with a suitable aperture through which the valve stem 19 may extend.

To the end that the cover assembly may be secured to the wheel structure in detachable relationship thereto, the intermediate annular portion 23 is provided at the radially outer part thereof with a plurality of circumferentially spaced openings 28 through which retaining clips are arranged to extend.

In the construction of Figures 1, 2 and 3, the retaining clips each include a generally axially inwardly extending resilient finger portion 29 having radially inwardly humped portions 30 at the inner extremity thereof. The fingers 29 extend axially outwardly through the wheel openings and are provided with outer loop portions 31 to which they are connected by means of a gooseneck portion 32 affording a generally radially outwardly opening groove or recess for purposes to be described presently. The axially outer portions 31 are provided with an enlarged radial dimension and terminate at the radially inner ends thereof in turned back portions 33. Thus it will be seen that when the fingers 29 are extended through the openings 28 in the cover, the axially outer portion 31 overlies the axially outer surface of the cover so that the radially inner extremity thereof nests substantially in the groove 26 of the cover while the radially outer extremity thereof nests substantially in the groove 24 of the cover.

With such a construction it will be seen that the entire radial expanse of the intermediate portion 23 of the cover is held in surface engagement with the adjacent portion of the outer surface of the body part 12 of the wheel when the fingers 29 of the respective clips are forced axially inwardly through the wheel openings so that the humped portions 30 thereof snap radially inwardly over the axially inner edges of the flange 12a of the wheel.

To the end that the axially outer portions of the clips and the openings 28 may be concealed and to the end that the intermediate portion of the cover may be efficiently reinforced, there is provided herein an annular, ornamental bead 34 having the radially outer margin thereof curled radially inwardly as at 35 and the radially inner margin thereof curled radially outwardly as at 36. It is the radially inner and outer curled margins of this annular member 34 which nest directly in the grooves 24 and 26 respectively of the cover member, these curled portions enveloping the radially inner and outer margins of the loop portions 31 of the clips as shown.

The radial dimension of the annular member 34 is such that, as described above, it envelops the loop portion of the retaining members to be held against separation therefrom and also is compressed slightly between the grooves 24 and 26 of the cover thus to apply cross-sectional stress thereto to greatly strengthen the cover assembly.

With the cover member, the retaining elements and the annulus 34 arranged in the above described manner, it will be seen that the retaining elements are fixedly secured to the cover to provide a unitary structure therewith and that engagement of the cover to and detachment thereof from the wheel merely involves axial inward or outward movement of the assembly from the wheel, whereby the resilient fingers 29, and particularly the humped portions 30 thereof are sprung radially to engage with and disengage from the axially inner extremity of the adjacent portion of the flange 12a of the central load bearing portion 12. With such a construction it will be seen that the possibility of loss of the retaining clips from the cover member when detached from the wheel structure is greatly minimized and furthermore, that the possibility of the passage of dirt and moisture through the openings 28 of the cover is greatly reduced since these openings are completely closed by the annulus 34.

In the constructions of Figures 4 and 5, it will be seen that there is also provided a circular, disk-like cover having the advantages and attributes of that disclosed in Figures 1, 2 and 3 and furthermore that in these constructions it is contemplated that the retaining members be maintained permanently upon the wheel structure while the reinforcing, ornamenting annulus, together with the cover, may be detachably secured to the retaining members.

Referring specifically to Figure 4, the cover includes an outer annular portion 37 which is constructed similarly to and has the attributes of the portion 21 of the assembly shown in Figure 2. In this construction the cover is also provided with a radially outer flanged portion 38 and a central crowned hub cap simulating portion 39, the portions 37 and 39 being joined together integrally by a generally axially inwardly grooved portion 40 having a plurality of circumferentially spaced apertures 41 therein. These apertures are arranged to be aligned with the respective wheel openings in order to receive retaining elements which include a plurality of clip members 42.

Each of the clip members 42 includes a pair of axially inwardly extending finger portions 43 and 44 which are bent back upon one another to form an enlarged loop portion 45 including a generally radially outwardly extending bump 46, the radial dimension of the loop being less than that of the apertures 42, whereby the loop may be passed through the apertures. The inner terminal ends of the fingers 43 and 44 are provided with generally radially outwardly, axially outwardly, obliquely disposed members 47 and 48 respectively, the terminal ends of which are arranged to bitingly engage the radially inner surface of the base flange 12 of the tire rim 10 when the clip members are forced into the wheel openings between the tire rim and the central load bearing portion 12. From Figure 4 it will be seen that when the clips are so urged into the wheel openings, the portions 47 and 48 thereof will be flexed radially inwardly to a slight degree whereby they will tend to spring radially outwardly and provide the desired biting engagement against the wheel parts, particularly when withdrawal of the respective clip member is attempted.

The cover assembly is completed by the provision of an annular reinforcing, ornamental member 49 having under-turned radially inner and outer edges 50 and 51 respectively. This annular member 49 is arranged to be disposed in nested relationship in the grooved portion 40 of the cover member when the under-turned edge 51 of the radially outer side thereof is sprung over the hump 46 of the respective clip members 42.

It will be seen that in assembling the cover construction of Figure 4, the cover member is first disposed concentrically over the wheel structure with the openings 41 thereof aligned with the respective clips 42, whereupon the cover is urged axially inwardly until the radially inner part of the grooved portion 40 supportingly abuts the adjacent portion of the outer surface of the central load bearing portion 12 of the wheel. Thereafter the annulus 49 is snapped on the spring clips 42.

When the parts are so assembled it will be seen that the retaining clips each retainingly, yet detachably engage the annulus 49 and that the radially outer and inner portions of the latter compressively draw the grooved portion 40 of the cover axially inwardly to securely maintain the cover assembly over the wheel structure.

In the construction of Figure 4, as in the construction of Figures 1, 2 and 3, the cover member is preferably constructed with such an initial configuration that when retained upon the wheel structure the radially outer part is slightly flexed by engagement against the edge portion 16 of the tire rim 10, whereby an initial condition of stress is placed upon the cover member, particularly at the radially outer portion thereof to increase the strength and maintenance thereof upon the wheel.

In the construction of Figure 4, the removal of the cover assembly from the wheel structure is accomplished by insertion of the point of a pry-off tool behind the radially outer extremity of the annulus 49, whereupon outward movement of the point of the tool with the edge portion 16 of the tire rim as the fulcrum will withdraw the annulus 49 over the spring clips to release the cover.

In the construction of Figure 5, the cover including the outer annular portion 52, the central crowned hub cap simulating portion 53, the radially outer flange 54, the intermediate annular grooved portion 55 and the apertures 56 is substantially similar to the covers previously described in that it is preferably formed from a synthetic plastic sheet material so that it may be temporarily, locally, resiliently flexed and yet will be self-sustaining as to form and will immediately snap back to its initial configuration when distorting pressures are relieved therefrom.

In this construction the retaining clips include axially inwardly extending portions 57 arranged to overlie the radially outer surface of the portions of the flange 12a defining the wheel openings, each axially extending portion being riveted to the respective part of the flange by means of a rivet 58. Each of the clips includes an axially outwardly extending portion having a radially outwardly extending hump 59 which serves as the junction between cam portions 60 and 61.

In the construction of Figure 5 the rigidifying, ornamental annulus 62 includes a generally radially inwardly extending corrugated portion 63 terminating in an underturned edge 64 and a generally axially inwardly extending flange 65 terminating in a bead 67. The cover member of Figure 5, as is the case in Figure 4 is arranged so that the openings thereof are aligned with the respective spring clips, whereby the cover may be urged axially inwardly until the intermediate part in the vicinity of the openings is in surface abutment with the adjacent portion of the outer surface of the central load bearing portion 12. Then the annular member 62 is aligned concentrically with the clip members and urged axially inwardly so that the bead 67 on the flange 65 thereof rides on the cam surfaces 61 of the retaining members to flex the same radially inwardly until the humps 59 are passed, whereupon the clips spring radially outwardly so that the bead 67 of the annular member 62 is securely retained in pressing engagement against the wheel by abutment of the cam surfaces 60 of the clips thereagainst. When in this position it will be seen that the bead 67 engages the curved portion 68 of the cover member to compressively draw the same axially inwardly of the wheel structure and to impose the above described condition of stress upon the radially outer portion 52 thereof.

From the foregoing it will be seen that in the forms of my invention shown herein there is provided a cover assembly which is detachably retained upon a wheel structure by virtue of retaining elements which extend through openings in the cover, these retaining elements being retainingly engaged by an annulus which in turn urges the cover member pressingly into engagement with the wheel structure.

Furthermore, in the construction of Figure 2, the cover assembly may be readily detached from the wheel structure by mere insertion of the point of a pry-off tool behind the radially outer portion of the annular member, whereupon the retaining members together with the cover and the annulus may be withdrawn from the wheel, while in the constructions of Figures 4 and 5 the application of the point of a pry-off tool behind the radially outer portion of the annulus results in the annulus and the cover being released from the retaining members, the latter remaining on the wheel structure.

Preferably, in the constructions shown herein, the annulus is constructed from a more rigid material, such as sheet metal or the like, whereby it offers considerable rigidity and reinforcement to the plastic cover and furthermore whereby it may be provided with a high luster finish to present a pleasing and ornamental contrasting appearance to the cover member proper.

In addition it will be seen that since, in the construction of Figures 1, 2 and 3, the retaining clips, together with the annulus, are removed from the wheel structure along with the cover, the annulus and thus the retaining clips are positively engaged by the cover by means of the nested relationship in the groove 24 of the cover, while in the constructions of Figures 4 and 5, since the annulus, together with the cover, is to be removed from the clips which are retained on the wheel structure, the annulus is merely retained by the clips resiliently against the wheel and cover with axially inward tension but without being positively interlocked in the cover.

What I claim is:

1. In a wheel structure including a flanged tire rim and a central load bearing portion, a cover including a circular member formed from sheet synthetic plastic material, said circular member comprising an outer annular part arranged to extend over the outer side of the rim and a central, crowned part, said annular and crowned parts being joined by an annular part having apertures formed therein, retaining means for maintaining the cover over the wheel structure including resilient clip members extending through said apertures, and an annular, relatively rigid, reinforcing bead member, said clip members each including an axially inner part engageable with the wheel and an axially outer part extending through the apertures in said cover, said bead member being arranged for retaining engagement on the outer part of the clips and having portions bearing against the outer side of the cover to maintain the same concentrically over the outer side of the wheel structure.

2. In a wheel structure including a flanged tire rim and a central load bearing portion, a cover including a circular member formed from sheet synthetic plastic material, said circular member having a cross-sectional dimension sufficiently large to enable the same to extend substantially over the entire outer side of the wheel with which it is associated and including an intermediate part formed to provide a plurality of circumferentially spaced apertures disposed in a circle concentric with the wheel structure, retaining means for maintaining the cover over the wheel structure including resilient clip members extending through said apertures, and relatively rigid means arranged for retaining engagement with the outer part of said clip members, said clip members each including an axially inner part engageable with the wheel and an axially outer part extending through the apertures in the cover, said relatively rigid means being arranged for retaining engagement on the outer part of the clips and having portions bearing against the outer side of the cover to maintain the same concentrically over the wheel structure and against the outer side thereof.

3. In a wheel structure including a flanged tire rim and a central load bearing portion, a cover including a circular member formed from sheet synthetic plastic material, said circular member including a radially outer annular part for disposition over the outer side of the tire rim to conceal the flanges thereof and having a cross-sectional configuration of such magnitude that it extends from substantially the radially outer part of the rim to a point radially inwardly on the wheel adjacent a junction of the tire rim and the central load bearing portion, said cover member also including a central circular hub cap simulating portion defined at its radially outer margin by a generally axially inwardly extending grooved portion which also serves as a junction with said radially outer cover portion, said grooved portion being provided with a plurality of circumferentially spaced apertures, retaining means for maintaining the cover over the wheel structure including attachment members extending through said apertures, and relatively rigid means arranged for retaining engagement with the outer part of said attachment members, said attachment members each including an axially inner part engageable with the wheel and an axially outer part extending through the apertures in the cover, said relatively rigid means being arranged for retaining engagement on the outer part of the attachment member and having a radial dimension greater than said apertures and also having portions bearing against the outer side of the cover adjacent the apertures to maintain the cover concentrically over the wheel structure and against the outer side thereof.

4. In a wheel structure including a flanged tire rim and a central load bearing portion, a cover including a circular member formed from sheet material, said circular member including a radially outer annular part for disposition over the outer side of the tire rim to conceal the flanges thereof and extending radially inwardly on the wheel, said cover member also including a central circular portion defined at its radially outer margin by a generally axially inwardly extending grooved portion which also serves as a junction with said radially outer cover portion, said grooved portion being provided with a plurality of circumferentially spaced apertures, retaining means for maintaining the cover over the wheel structure including attachment members extending through said apertures, and relatively rigid means arranged for retaining engagement with the outer part of said attachment members, said attachment members each including an axially inner part engageable with the wheel and an axially outer part extending through the apertures in the cover, said relatively rigid means being arranged for retaining engagement on the outer part of the attachment member and having a radial dimension greater than said apertures and also having portions bearing against the outer side of the cover adjacent the apertures to maintain the cover concentrically over the wheel structure and against the outer side thereof, said grooved portion including a radially bridging part arranged for surface abutment with the adjacent portion of the outer surface of the wheel structure to provide intermediate axial support for the cover.

5. In a wheel structure including a flanged tire rim and a central load bearing portion, a cover including a circular member formed from sheet material, said circular member including a radially outer annular part and a central circular hub cap simulating portion defined at its radially outer margin by a generally axially inwardly extending grooved portion which also serves as a junction with said radially outer cover portion, said grooved portion being provided with a plurality of circumferentially spaced apertures, retaining means for maintaining the cover over the wheel structure including attachment members extending through said apertures, and relatively rigid means arranged for retaining engagement with the outer part of said attachment members, said attachment members each including an axially inner part engageable with the wheel and an axially outer part extending through the apertures in the cover, said relatively rigid means being arranged for retaining engagement on the outer part of the attachment member and having a radial dimension greater than said apertures and also having portions bearing against the outer side of the cover adjacent the apertures to maintain the cover concentrically over the wheel structure and against the outer side thereof, said central load bearing portion of the wheel being provided at the radially outer part thereof with radially inwardly depressed, circumferentially spaced sections to provide openings along the junction of the tire rim and the central load bearing portion, said attachment members including axially inwardly extending fingers arranged to engage in said openings to maintain the cover on the wheel structure.

6. In a wheel structure including a flanged tire rim and a central load bearing portion, there being circumferentially spaced openings along the junction of the tire rim and the central load bearing portion, a cover assembly for disposition over the outer side of the wheel including an outer part and a central crowned part arranged to conceal the outer side of the load bearing portion, said cover portions being joined by an annular, axially inwardly grooved cover section defined on its radially outer side by a generally radially inwardly opening groove and on its radially inner side by a generally radially outwardly opening groove, apertures formed in said annular cover section and retaining means for maintaining the cover over the outer side of the wheel structure including resilient retaining clips having axially inwardly extending arms adapted for attachment in the wheel openings, said arms extending through said apertures in the cover and terminating in axially outwardly looped portions, and an intermediate, annular rigidifying bead for concealing the outer parts of said clip members, said bead having radially inner and outer marginal portions arranged for nested engagement in said radially outwardly and radially inwardly opening grooves in the cover, respectively, whereby said bead rigidifies the intermediate portion of the cover and conceals the apertures therein and the outer portions of said clips, said axially inwardly extending arms of each of the clips being arranged for detachable engagement against a wheel part at one of said respective wheel openings.

7. In a wheel structure including a flanged tire rim of the drop center type and a central load bearing portion, there being circumferentially spaced wheel openings along the junction of said tire rim and said load bearing portion, a cover assembly for disposition over the outer side of said wheel to conceal the same, said cover including a radially outer annular part and a central circular, crowned part, there being an annular integral axially inwardly grooved cover part between said first named cover part, said annular part being provided with circumferentially spaced apertures arranged for alignment with the said wheel openings, retaining means for maintaining the cover over the outer side of the wheel structure including a plurality of spring clip members comprising axially inwardly extending arm portions provided with radially outwardly, axially outwardly, obliquely disposed fingers, said arms being jointed by an axially outwardly extending resilient loop portion, said fingers being arranged to bitingly engage one of said wheel parts when said arms are forced axially inwardly through said wheel openings, said axially outwardly extending loop portion being arranged to extend through the respective aperture in the cover, and an annular rigidifying bead provided with an under-turned edge portion arranged for detachable engagement with the axially outer loop portion of said clips, said bead being arranged to engage portions of the outer surface of the cover adjacent said apertures to maintain the cover tightly upon the wheel structure when so engaging the clip members.

8. In a wheel structure including a flanged tire rim and a central load bearing portion, a cover including a circular member arranged for disposal against the outer side of said wheel structure, said circular member having a plurality of concentrically arranged circumferentially spaced apertures therethrough, and retaining means for maintaining the cover over the wheel structure including retaining elements each having an inwardly projecting portion detachably engageable with the wheel and having an axially outwardly extending portion adapted to extend through said apertures and also including an annulus having a portion arranged for retaining engagement with the axially outer part of said retaining elements, thereby to conceal the outer ends of said retaining elements and said apertures and to urge the cover axially inwardly on said retaining elements and against an adjacent portion of the outer surface of the wheel, said circular member, retaining elements and annulus being removable as a unit from said wheel.

9. In a cover structure for disposition on the outer side of a vehicle wheel, a cover member having generally divergently related portions affording an outwardly opening groove, a reinforcing bead member interengagingly seated in said groove, and retaining clips carried by said bead member and extending in concealed relation for attachment of the assembly to a wheel.

10. In a cover assembly including a cover member for disposition in covering relation at the outer side of a vehicle wheel, a retaining bead for holding the cover member in place on the wheel, and a plurality of retaining clips carried by said bead and having portions thereof extending behind the bead and engageable in snap-on, pry-off relation with a portion of the wheel for retaining the cover assembly on the wheel.

GEORGE ALBERT LYON.

REFERENCES CITED

The following references are of record in the file of this patent:

UNITED STATES PATENTS

| Number | Name | Date |
|---|---|---|
| 2,028,207 | Hamilton | Jan. 21, 1936 |
| 2,148,160 | Hollerith | Feb. 21, 1939 |
| 2,166,216 | Lyon | July 18, 1939 |
| 2,167,102 | Burger | July 25, 1939 |
| 2,368,254 | Lyon | Jan. 30, 1945 |